United States Patent
Barral et al.

(10) Patent No.: US 9,214,087 B2
(45) Date of Patent: Dec. 15, 2015

(54) DEVICE FOR ASSISTING AIRCRAFT CREW WHEN PERFORMING FLIGHT LEVEL CHANGES

(75) Inventors: Jerome Barral, Paris (FR); Nicolas Le Corre, Paris (FR); Audren Kervella, Le Chesnay (FR)

(73) Assignee: DASSAULT AVIATION, Paris (FR)

( * ) Notice: Subject to any disclaimer, the term of this patent is extended or adjusted under 35 U.S.C. 154(b) by 95 days.

(21) Appl. No.: 13/239,280

(22) Filed: Sep. 21, 2011

(65) Prior Publication Data

US 2012/0095623 A1    Apr. 19, 2012

(30) Foreign Application Priority Data

Sep. 21, 2010  (FR) ..................... 10 03755

(51) Int. Cl.
*G05D 1/00*  (2006.01)
*G08G 5/00*  (2006.01)
*G01C 23/00*  (2006.01)

(52) U.S. Cl.
CPC ............ *G08G 5/0008* (2013.01); *G01C 23/005* (2013.01); *G08G 5/0013* (2013.01); *G08G 5/0021* (2013.01); *G08G 5/0039* (2013.01); *G08G 5/0052* (2013.01); *G08G 5/0078* (2013.01)

(58) Field of Classification Search
None
See application file for complete search history.

(56) References Cited

U.S. PATENT DOCUMENTS

| | | | | |
|---|---|---|---|---|
| 4,823,272 A * | 4/1989 | Inselberg | ................ | G01S 7/22 701/120 |
| 6,348,877 B1 * | 2/2002 | Berstis | ................ | G01C 23/005 340/961 |
| 6,389,355 B1 | 5/2002 | Gibbs et al. | | |
| 6,992,597 B2 * | 1/2006 | Rogers | ................... | G01C 23/00 340/948 |
| 7,158,073 B2 * | 1/2007 | Ybarra | ................ | G08G 5/0052 342/29 |
| 7,298,291 B2 * | 11/2007 | von Thal | ................ | B64D 39/00 244/135 A |
| 7,309,048 B2 * | 12/2007 | von Thal | ................ | B64D 39/00 244/135 A |
| 7,382,285 B2 * | 6/2008 | Horvath | ................ | G01C 23/00 340/961 |
| 7,570,178 B1 * | 8/2009 | Whalen | ................ | G08G 5/0078 340/945 |
| 8,203,465 B2 * | 6/2012 | Shafaat | ................ | G08G 5/0008 340/945 |
| 8,271,152 B2 * | 9/2012 | Singer | ................... | G01C 23/00 701/300 |

(Continued)

FOREIGN PATENT DOCUMENTS

| | | |
|---|---|---|
| EP | 1 323 150 B1 | 4/2005 |
| EP | 1 218 698 B1 | 1/2008 |
| EP | 2 159 544 A1 | 3/2010 |

(Continued)

OTHER PUBLICATIONS

Search Report and Written Opinion issued on Apr. 6, 2011 for French Application No. 1003755.

*Primary Examiner* — John R Olszewski
*Assistant Examiner* — Jean-Paul Cass
(74) *Attorney, Agent, or Firm* — Davidson, Davidson & Kappel, LLC

(57) ABSTRACT

This device providing assistance to aircraft crew for a flight level change of the aircraft in air traffic, comprising means for viewing the position of the aircraft in the vertical plane, is wherein the viewing means comprise: display means capable of displaying an image comprising at least one zone corresponding to a target altitude (FL) for the aircraft, and in that it comprises: selection means for selecting said zone in the image.

13 Claims, 14 Drawing Sheets

(56) References Cited

U.S. PATENT DOCUMENTS

| | | | | |
|---|---|---|---|---|
| 8,417,397 | B2* | 4/2013 | Khatwa | G01C 23/00 701/14 |
| 2004/0024528 | A1* | 2/2004 | Patera | G08G 5/045 701/301 |
| 2005/0007270 | A1* | 1/2005 | Block | G01C 5/005 342/65 |
| 2006/0028328 | A1* | 2/2006 | Cresse | B60Q 1/525 340/435 |
| 2007/0023574 | A1* | 2/2007 | von Thal | B64D 39/00 244/135 A |
| 2007/0023575 | A1* | 2/2007 | von Thal | B64D 39/00 244/135 A |

FOREIGN PATENT DOCUMENTS

| | | | | |
|---|---|---|---|---|
| FR | 2 897 975 | A1 | 8/2007 | |
| FR | 2 945 360 | A1 | 11/2010 | |
| WO | WO 02058033 | A2 * | 7/2002 | ............ G08G 5/04 |
| WO | 2005038748 | A2 | 4/2005 | |
| WO | 2009035757 | A2 | 3/2009 | |
| WO | WO 2009035757 | A2 * | 3/2009 | ............ G08G 5/00 |

* cited by examiner

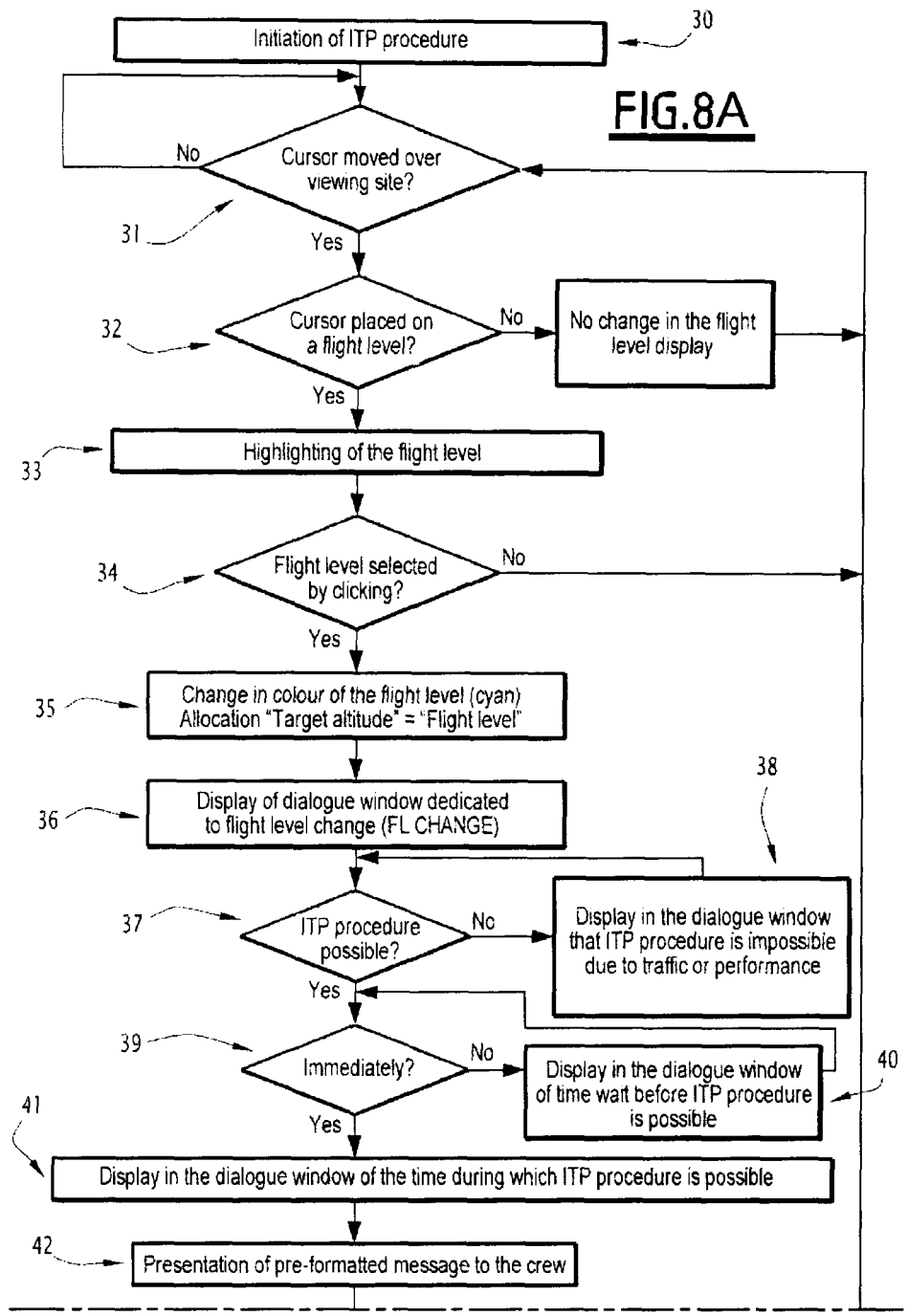

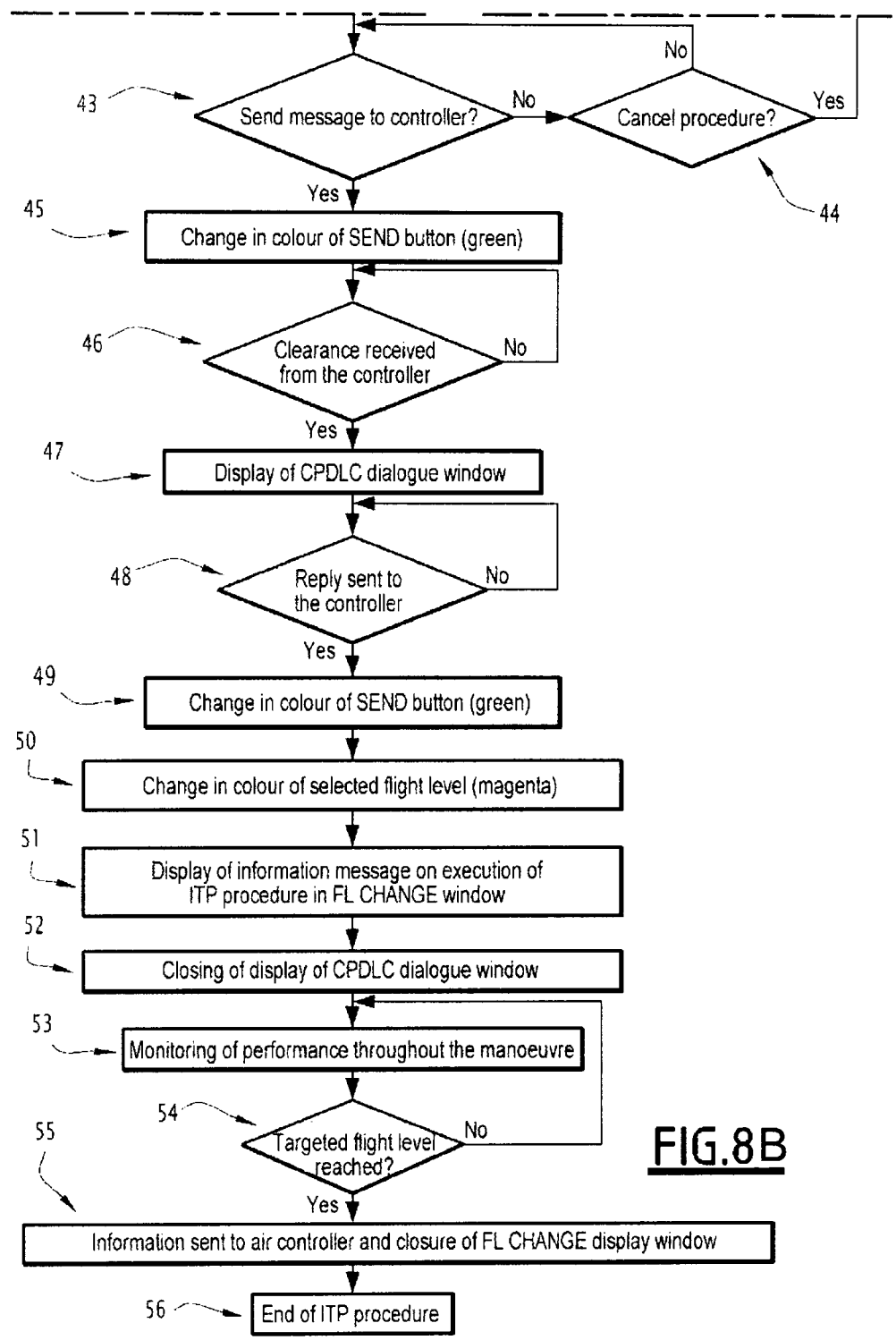

DEVICE FOR ASSISTING AIRCRAFT CREW WHEN PERFORMING FLIGHT LEVEL CHANGES

CROSS-REFERENCE TO RELATED APPLICATIONS

This application claims the benefit of French Application No. 10 03755 filed Sep. 21, 2010 which is hereby expressly incorporated by reference in its entirety.

BACKGROUND OF THE INVENTION

1. Field of the Invention

The present invention concerns a device for assisting an aircraft crew during changes in flight altitude.

2. Description of the Related Art

Aircraft crews are regularly led to seeking changes in flight altitude in particular on long haul flights, to optimise the performance of the aircraft, to avoid heavy traffic or adverse weather conditions.

These changes require authorisation from an air traffic controller often over-burdened with requests and giving fairly low priority to these types of manoeuvres.

Additionally, such manoeuvres are very often requested in oceanic spaces in which controllers are in charge of very large areas and communicate via HF link, which entails strong latency in the processing of requests.

The crew must therefore be well aware of the tactical situation i.e. the status of surrounding traffic so that a request is emitted at the best expedient moment thereby maximising the chances of receiving clearance from the controller.

In the remainder of the description, abbreviations, acronyms and English expressions recognised as such in the aeronautics field will be used for reasons of clarity.

Therefore in the remainder of the description the following expressions in particular are used:

ADS-B (Automatic Dependent Surveillance-Broadcast) which is a system enabling direct data exchanges between aircraft on their status (identification, position, or speed, etc.). ADS-B OUT capability is used for an aircraft capable of emitting such data, and ADS-B IN capability for an aircraft able to receive and use the data emitted by other aircraft.

AFCS (Automatic Flight Control System), a system managing the aircraft's automatic flight.

ATSA-ITP (Airborne Traffic Situational Awareness-In Trail Procedure), a procedure allowing more frequent changes in flight altitude, despite relatively heavy traffic, provided a certain number of criteria are verified. This procedure is one of the first procedures to come into force drawing advantage from ADS-B capabilities.

Clearance, which is the authorisation received from air traffic control allowing the conducting of a manoeuvre as indicated above.

CPDLC (Controller-Pilot Data Link Communications), which is a system allowing communication with the air traffic controller, based on an exchange of messages of <<SMS>> type containing standardized phraseology.

Longitudinal separation distance which is the procedural distance that an aircraft must maintain with a preceding aircraft, on instruction given by the controller. These distances may vary from one air space to another.

Flight Level/FL which is the altitude followed by aircraft in cruising phase, calculated in hundreds of feet (FL340=34000 feet for example) in increments of 10 or 20 depending on the airspace concerned.

As part of the awareness of the aforementioned tactical situation, the crew is traditionally informed of this situation, but solely in the horizontal plane via a Cockpit Display of Traffic Information—CDTI, even, to a lesser extent via a Traffic Collision Avoidance System—TCAS. The flight levels or FLs of surrounding aircraft can also be provided, but it is up to the crew to reconstruct the situation in the vertical plane, by cross-checking the different available data.

However, faced with the constant increase in air traffic, a new procedure has been developed to facilitate changes in flight level.

This procedure called ATSA-ITP for <<Airborne Traffic Situational Awareness-In Trail Procedure>> is described in ED-159 <<Safety Performance and Interoperability Requirements Document for ATSA-ITP Applications, Eurocae, July 2008>>.

This procedure is based on new capabilities brought by ADS-B technology: Automatic Dependent Surveillance-Broadcast.

While this procedure effectively allows changes in flight level which were impossible up until now with regulations in force, it nevertheless requires much more fine-tuned analysis of the tactical situation and the transmission of additional information to the controller such as the longitudinal separation minima or the identifiers of surrounding aircraft.

It will therefore be understood that the existing systems are not the most intuitive and hence are potentially sources of interpreting errors.

In addition, no assistance is given to the crew for transmitting the necessary data to the air controller, the crew either having to enter this data manually or to transmit the same to the controller via radio, which may also be an additional source of error at the time of data transmission.

SUMMARY OF THE INVENTION

It is the objective of the invention to overcome these shortcomings.

For this purpose, the subject-matter of the invention is a device for providing assistance to aircraft crew for changes in flight level of the aircraft in air traffic, comprising means displaying the position of the aircraft in the vertical plane, characterized in that the display means comprise:

display means able to display an image comprising at least one zone corresponding to a target altitude for the aircraft, and in that it comprises:

means for selecting said zone in the image.

According to other characteristics of this device, taken alone or in combination:

said display means are also capable of displaying a symbol in the image individually identifying the aircraft and any surrounding aircraft, said display means are also capable of displaying an axis system in the image comprising a Y-axis representing altitude and an X-axis representing the distance separating the aircraft from any surrounding aircraft, the display means are capable of displaying a symbol identifying an aircraft considered to be a reference aircraft in order to perform a change in flight level towards the selected target altitude, the display means are capable of displaying a symbol identifying an aircraft making an immediate change in flight level impossible towards the selected target altitude, said display means are also capable of displaying means in the image for translating in the vertical plane the zones corresponding to the target altitudes, it comprises computing means capable in real-time, as per a function of estimated opportunity, of determining the feasibility of a flight level change procedure towards the selected target altitude in relation to air traffic for a given time horizon, these computing means are also capable of performing a set of processing operations to produce data intended for the crew on the said feasibility of carrying out flight level change procedure towards the selected target altitude, said data produced by the computing means comprise:

a remaining period of feasibility for said procedure when it is possible, or a feasibility waiting period to perform said procedure when it is not possible immediately but will be possible later, and in that said display means are capable of displaying in the image this data intended for the crew, the computing means are also capable of verifying the performance of the aircraft during the said procedure, the computing means, using the selected target altitude, are also capable of forming a pre-formatted request to be sent to the air traffic controller, the computing means being capable of instructing the display means to display this request in the image when the flight level change procedure towards the selected target altitude is possible, the selection means comprise pointer means allowing a cursor to be moved over the image, and means to validate the zone pointed by the cursor, the pointer means are included in the group comprising a mouse, a lever, a keypad and a touch screen, and in that the selection means comprise at least one button, the selection means, for each target altitude, comprise a key arranged in the vicinity of the zone of the image associated with the corresponding target altitude, and the flight changes are implemented in accordance with procedure of ITP type.

BRIEF DESCRIPTION OF THE DRAWINGS

The invention will be better understood from the following description given solely as an example and with reference to the appended drawings in which:

FIGS. 8A and 8B give a flow chart indicating ITP flight level change procedure;

DETAILED DESCRIPTION OF THE PREFERRED EMBODIMENT

Figure 1:
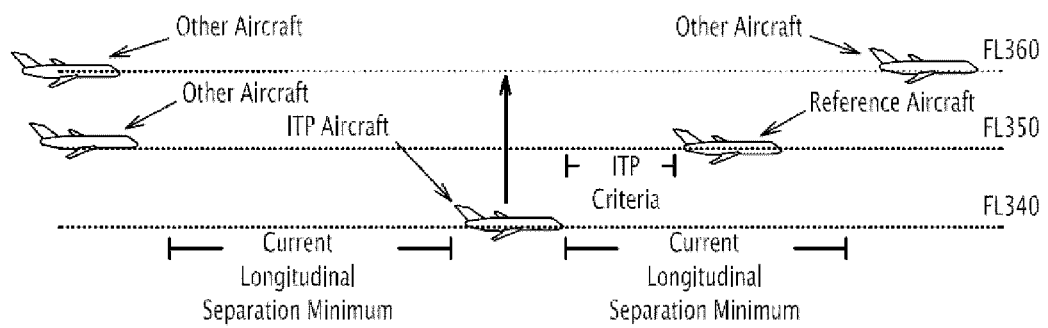
FIG. 1 illustrates the principle of ATSA-ITP procedure such as taken from the aforementioned ED-159.

FIG. 1 illustrates the principle of an ATSA-ITP procedure whose purpose is to allow more frequent flight level changes by reducing the longitudinal separation minima with aircraft flying on intermediate flight levels.

As illustrated FIG. 1, subject to verification of a certain number of criteria, the separation distances from aircraft on intermediate flight levels can be considerably reduced. These aircraft with which the longitudinal separation minimum is reduced are considered to be <<reference aircraft>>. Therefore, there may be one or two reference aircraft and the flight crew, in its request sent to the air traffic controller, must include the identifiers of these aircraft and the distances separating them from its own aircraft.

This is well known in the state of the art. Indeed, it is one of the primary functions based on the capabilities of ADS-B technology.

In this FIG. 1, the aircraft wishing to change its flight level is designated the <<ITP Aircraft>>, the reference aircraft being designated the <<Reference Aircraft>> and the other aircraft being designated as <<Other Aircraft>>. The flight levels are denoted for example under the designations FL340, FL350 and FL360 corresponding to the different flight levels.

In this illustration, the Y-axis is therefore graduated as per altitude, whilst the X-axis represents the distance separating the different illustrated aircraft, a distance such as defined by ED-159.

As previously indicated, an ITP manoeuvre requires entry by the flight crew of a large number of data via means that are scarcely intuitive such as keyboards for example or other means.

As also indicated, these data entry operations are a potential source of error.

Figure 2:
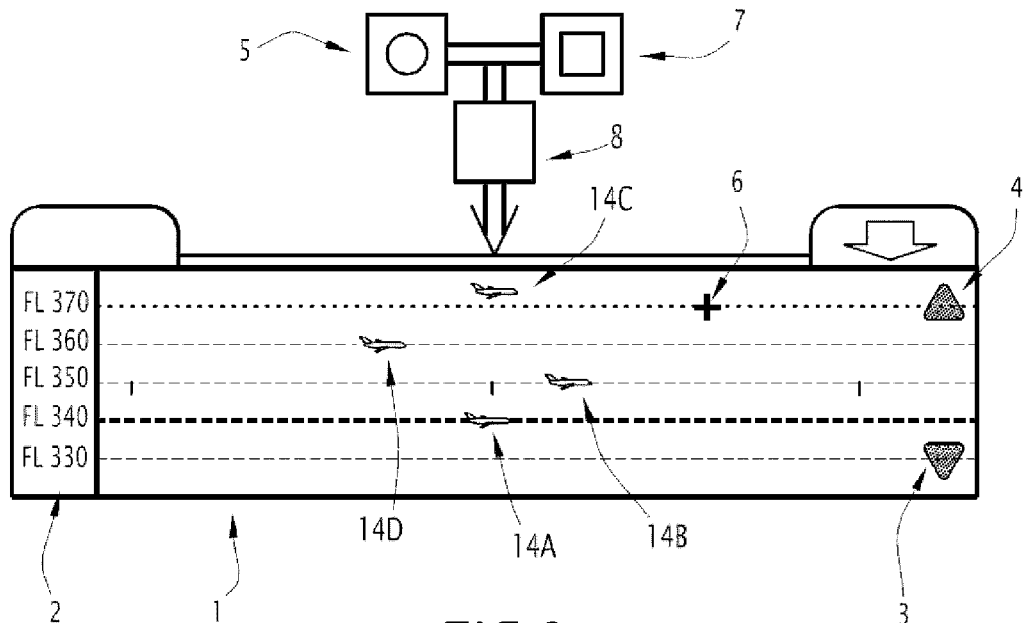
FIG. 2 illustrates means for viewing the vertical tactical situation forming part of the device according to the invention.

To remedy the above and as illustrated FIG. 2, the present invention proposes the use of viewing means in the vertical plane of the aircraft's position, these viewing means comprising display means capable of displaying an image comprising at least one zone corresponding to a target altitude (FL) for the aircraft and means for selecting said zone in the image.

The invention enables the crew to initiate flight level change procedure (ITP or standard) by direct selection of the graphical object representing the targeted flight level in a view of the tactical situation projected in the vertical plane.

This graphical selection is therefore highly intuitive and benefits from immediate visual return which limits the possibilities of error in selecting the flight level.

Therefore in this FIG. 2, viewing means are illustrated carrying the general reference 1, showing the tactical situation projected in the vertical plane at different flight levels along the Y-axis carrying the general reference 2, and comprising for example as in the illustrated example five flight levels FL330, FL340, FL350, FL360 and FL370. Different aircraft are therefore graphically represented by illustrations 14A to 14D in this tactical situation, in particular aircraft 14A piloted by the crew wishing to perform a flight level change. The positions of these aircraft move in real-time on the screen.

These display means are therefore associated with different interfacing means with the crew, comprising for example buttons 3 and 4 enabling the crew to scroll vertically through the flight levels i.e. to translate the flight level display to the vertical plane, and means allowing a desired target flight level to be selected for performing flight level change procedure.

Different embodiments of means for selecting this target flight level can be envisaged.

For example, these selection means may comprise means 5 for pointing to the desired zone (allowing movement of a cursor 6 over the image) associated with a validation button 7 to validate the pointed area. A mouse, a lever, a keypad or touch screen can also be envisaged.

These means enable the crew to point to the corresponding flight level and to validate the selection by pressing on the validation button 7.

Another embodiment of these selection means will be described below.

These different members are associated with computing means generally designated under reference 8 in FIG. 2, which will be described in more detail in the remainder hereof.

Figure 3:
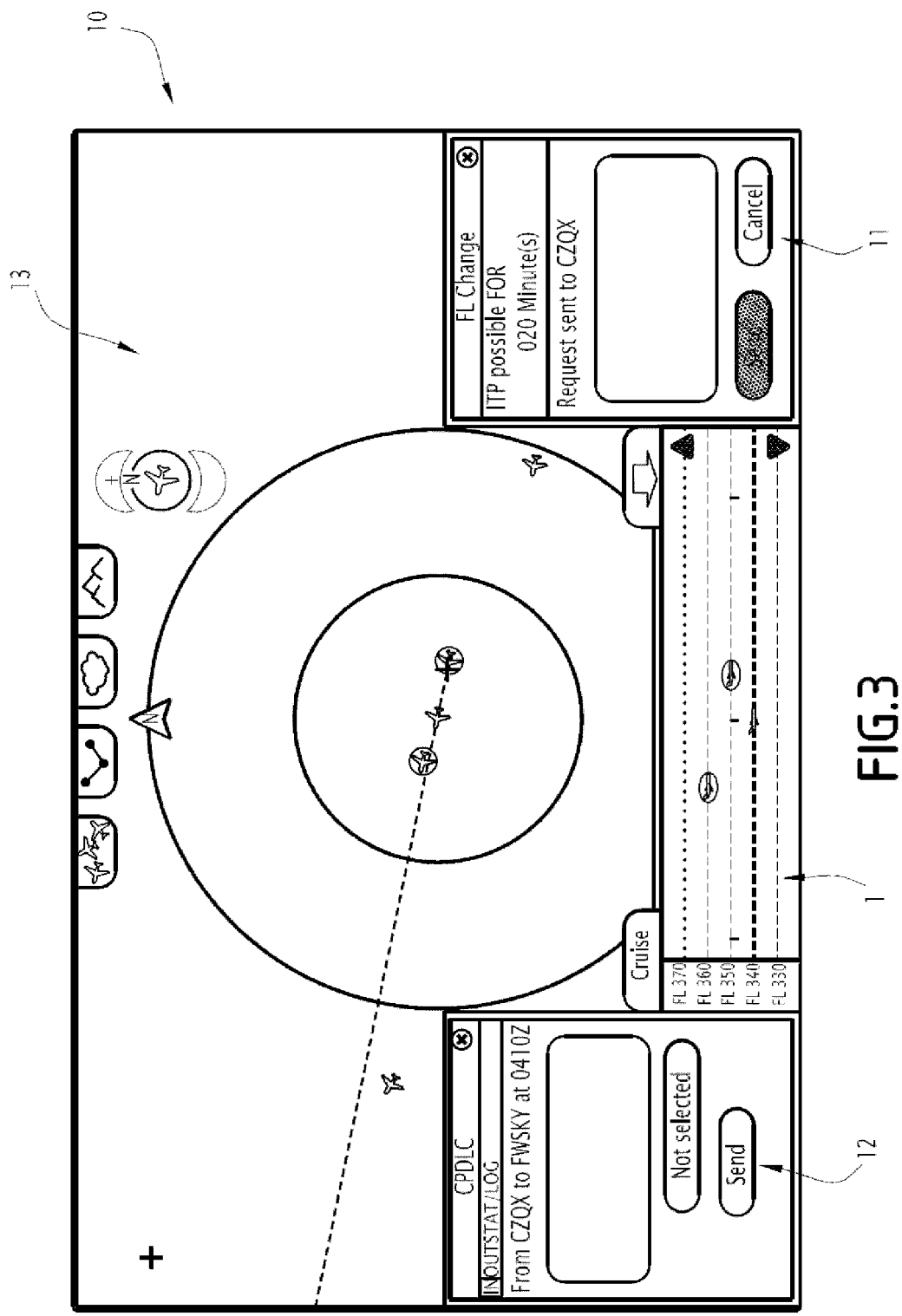
FIG. 3 illustrates a screen integrating said viewing means.

The viewing display 1 can be integrated for example in a global situation screen such as the one carrying the general reference 10 in FIG. 3.

The display is still designated by general reference 1 in this FIG. 3 and either side thereof there are dialogue windows, respectively 11 and 12, whose functions ware described in more detail below.

A representation of the tactical situation in the horizontal plane can also be associated with the display 1 on the screen 10, this representation being generally referenced 13 in this FIG. 3.

Figure 4:
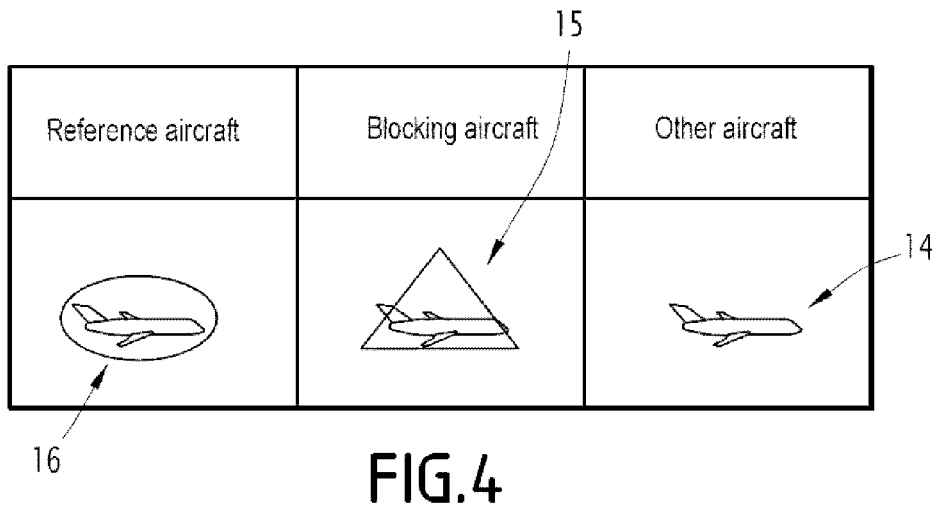
FIGS. 4, 5 and 6 illustrate different examples of embodiment of traffic symbology.
Figure 5:
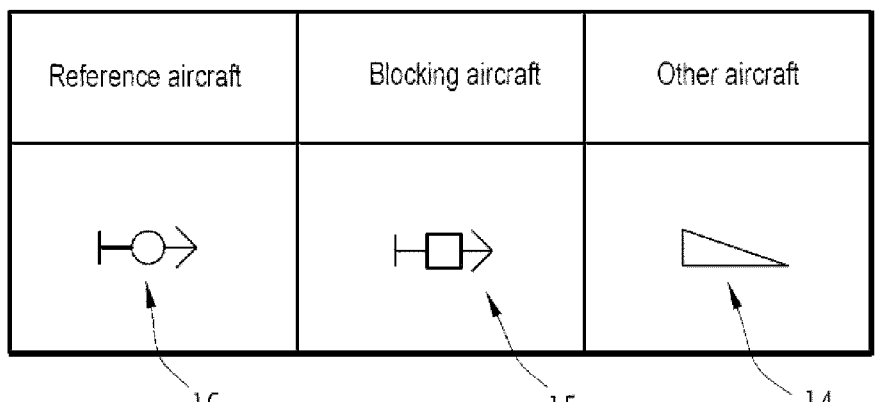
Figure 6:
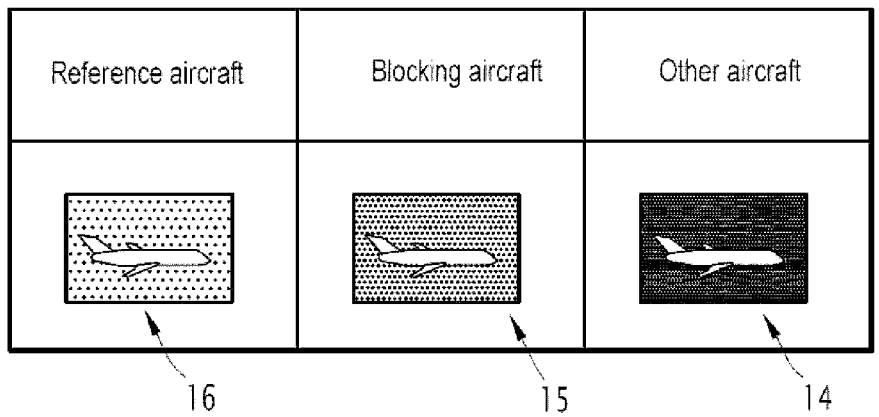

As part of the improved perception of the tactical situation by the crew, special symbology allowing easy perceiving of the type of surrounding aircraft can also be envisaged as is illustrated in FIGS. 4, 5 and 6.

For example in FIG. 4, an aircraft can be schematised by a symbol 14, this possibly being integrated in a particular geometric figure that differs according to the type of aircraft (triangle 15 for an aircraft blocking the flight level change procedure, oval 16 for an aircraft used as reference during the flight level change procedure).

In FIG. 5, different symbols are used to materialise these aircraft, whilst in FIG. 6 the distinction between the types of aircraft is materialised by different colours.

After graphical selection by the crew of the desired flight level, the different means integrated on board the aircraft i.e. different on-board computers such as the computing means 8 described previously, proceed with determining the desired target altitude corresponding to the zone in the image selected by the crew, and then analyse the resulting tactical situation for the aircraft (estimation of the feasibility of a flight level change).

The result of this analysis of the tactical situation is then presented to the crew in the form of a message whose content is detailed below.

For this purpose, the computers implement an opportunity estimation function which performs several processing operations allowing assistance to be given to the pilot's desire to perform an ITP procedure for flight level change.

This is performed:
  using data provided by ADS-B IN, i.e. the receiving of data from other aircraft, this function then estimates the possibility of ITP procedure in real-time, verifying the criteria required for acceptance thereof by air traffic control, these criteria being exhaustively described in ED-159 mentioned above. Therefore, having regard to surrounding aircraft, it computes the ITP distances (the ITP distance between two aircraft is described in ED-159) and the closing speeds thereof. It also estimates whether the minimum performance levels required by the standard are held by the aircraft desiring to make a flight level change. This set of processing operations allows the crew to be informed on the possibility or not of carrying out the ITP procedure immediately or later, and provides the crew with additional information to allow identification on the screen of the <<other>>, <<reference>> or possibly <<blocking>> aircraft, by means of the symbology described above;

the opportunity function, at a time horizon characteristic of the ADS-B IN range, also estimates the status of surrounding traffic. This estimation allows computing of the criteria of the tactical situation in this image. This set of processing operations allows the estimation function, if ITP procedure is possible, to determine the time until when such procedure will be possible. If ITP procedure is not immediately possible, the function estimates the time when the procedure will become possible, or whether it will not be possible within the given time horizon;

and finally, the opportunity estimation function also carries out verification during the manoeuvre, when the procedure has been given clearance by air traffic control, to ensure that the performance of the aircraft meets the required minima in ED-159 to carry out the manoeuvre.

The result of these different processing operations is then presented to the crew in a dialogue window which summarizes data on the flight level change.

Figure 7:
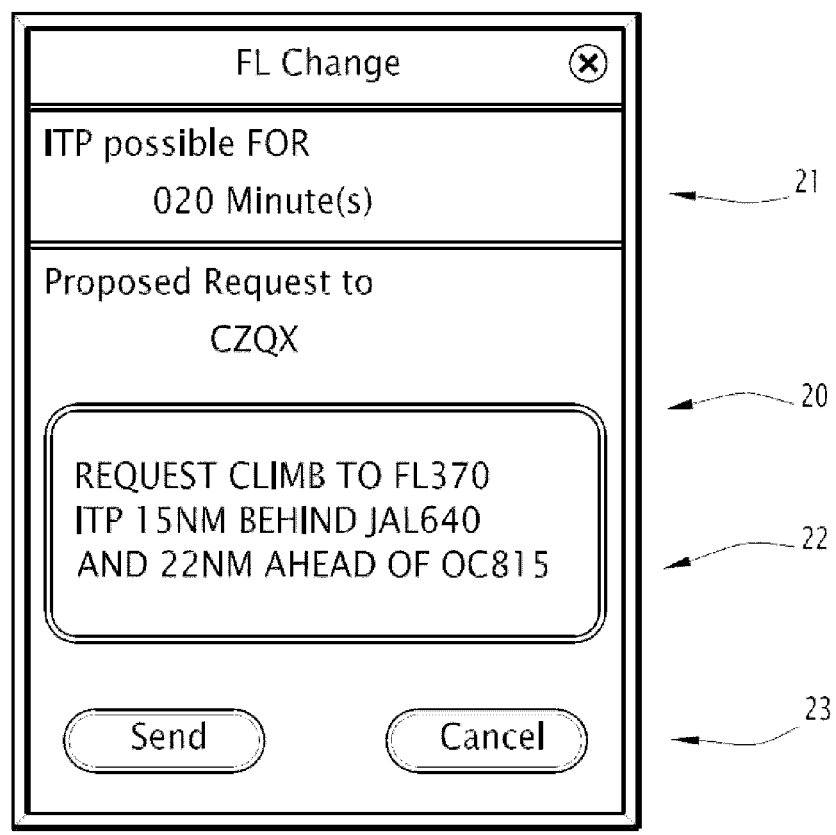
FIG. 7 illustrates an example of embodiment of a dialogue window for flight level change.

This window is illustrated FIG. 7 and is generally designated under reference 20.

As is illustrated, this window is composed of two parts, namely an upper part generally designated under reference 21 which shows the time interval for feasibility of the manoeuvre, also called the <<opportunity window>>, and a lower part intended to present the crew with the pre-formatted request for change of flight level to be sent to air traffic control if the requested manoeuvre is immediately possible. If the manoeuvre is not immediately possible, this request will only be displayed in the lower part of the window at the time when the manoeuvre becomes possible.

This lower part presenting the pre-formatted request is designated under general reference 22 in this FIG. 7.

Means for validating and cancelling the procedure are also provided and are designated under general reference 23 in this FIG. 7.

The opportunity window 21 may present different statuses from among the following:
  <<ITP possible FOR XXX minutes>>: the pre-formatted request is then presented to the crew in the lower part 22;
  <<ITP possible IN XXX minutes>>: the crew can then refer to the tactical display to know which traffic member is blocking procedure;
  <<ITP impossible due to Traffic>>: similarly the crew can refer to the tactical display to see which traffic member is blocking procedure;
  <<ITP impossible due to Performance>>: the aircraft does not have the minimum required climb/descent performance levels to carry out an ATSA-ITP procedure.

In the example illustrated FIG. 7, the window indicates <<ITP possible FOR 020 Minutes>> indicating that ITP procedure is possible within the next twenty minutes.

In the illustrated example, the pre-formatted request intended for air traffic control CZQX, is a request to climb to flight level FL370 giving distance data relative to aircraft leading and trailing the aircraft under consideration which are considered as reference aircraft (JAL640 and OC815).

An exemplary embodiment of ITP procedure is given in FIGS. 8A and 8B which show this procedure in the form of a flow chart, these FIGS. 8A and 8B to be read in connection with FIGS. 9 to 15 which show the corresponding viewing display delivered to the crew by the tactical situation display means.

Also in this example of embodiment, the graphical selection of the desired flight level is performed by use of a cursor which can be moved by the crew via a thumb wheel for example or other means, and the selected flight level can be validated for example by any form of button or other means.

In FIG. 8A, the initiation of ITP procedure is designated by general reference 30.

At 31, it is detected whether or not the cursor is moved over the viewing means under action performed by the crew.

If such is the case, it is verified at 32 whether the cursor is positioned on a possible flight level. If this is the case, this flight level is displayed with highlighting at step 33.

At 34, it is verified whether this flight level is selected by the button in order to trigger a change in colour of the flight level (cyan) and allocation of the <<target altitude>> equivalent to the <<flight level>>, at step 35.

At 36, the display is triggered of a dialogue window dedicated to flight level change (FL CHANGE).

At 37, the on-board means determine whether or not ITP procedure is possible.

If it is not possible, at step 38 the display is triggered in the dialogue window that ITP procedure is impossible due to traffic or aircraft performance.

If this ITP procedure is possible at 37, it is determined whether or not it is immediately possible at 39.

If such is not the case, at 40 the display is triggered in the dialogue window of the time wait before ITP procedure becomes possible.

On the other hand, if at 39 ITP procedure is immediately possible, the time is displayed at 41 in the dialogue window during which ITP procedure remains possible.

Figure 9:
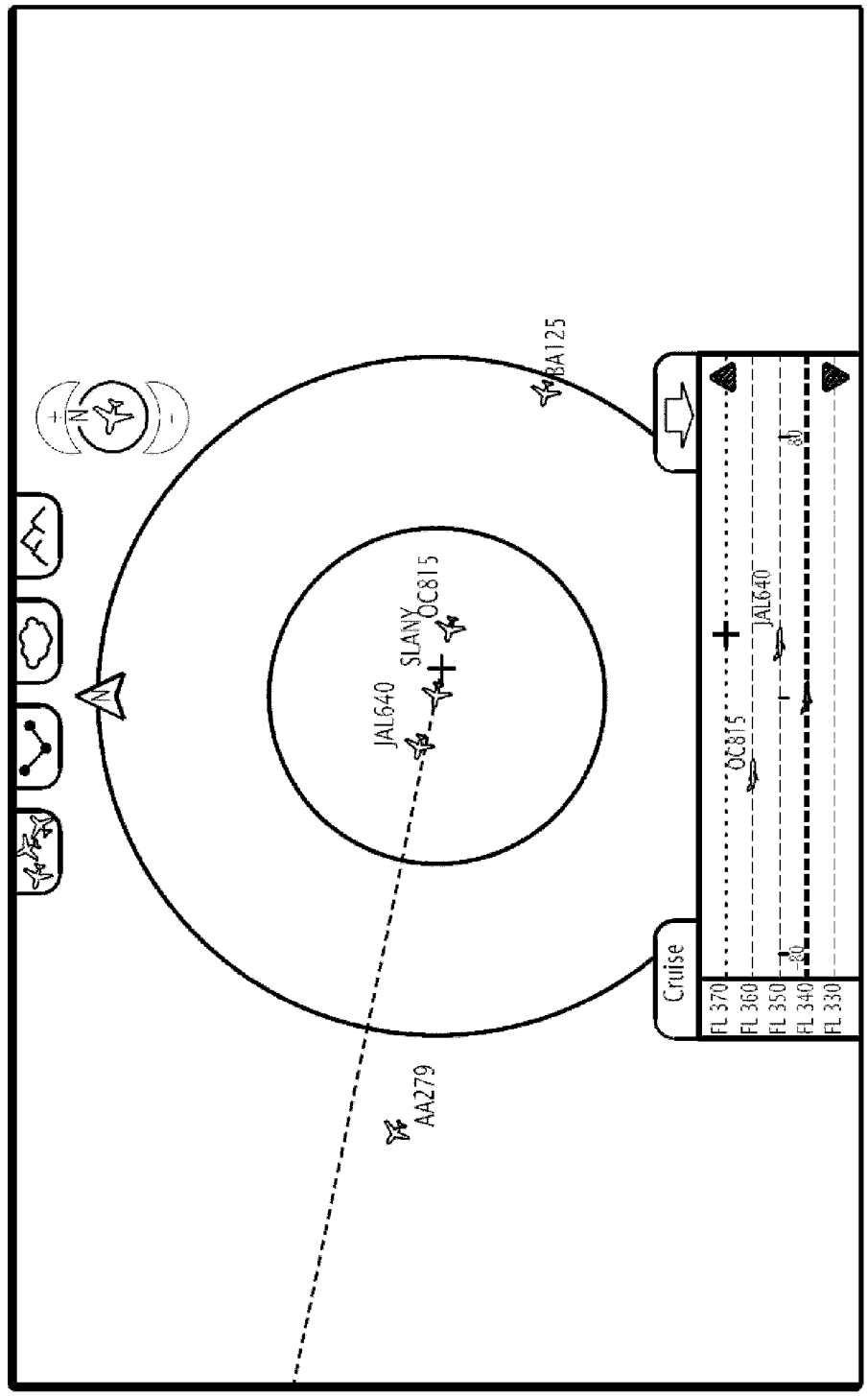
FIGS. 9 to 15 show the different screen displays during this procedure.
Figure 10:
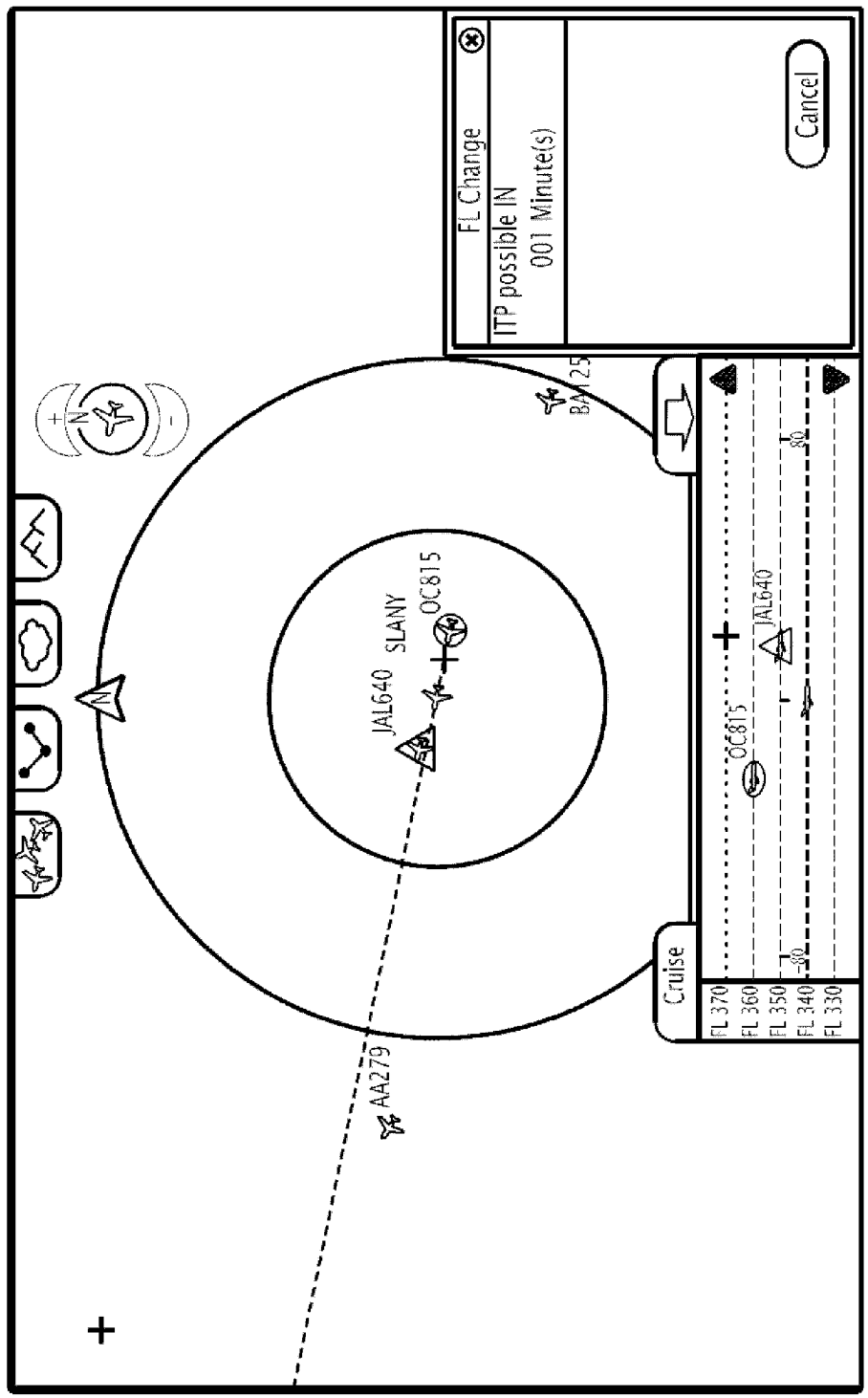

These different operations are illustrated in FIGS. 9 and 10.

The scenario of this ITP flight level change is as follows.

In FIG. 9, it can be seen that the crew is blocked at level FL340 and that the higher levels are occupied by fairly close aircraft. The crew nevertheless decides to request a flight level change to flight level FL370, by graphically selecting the same, to obtain a more precise evaluation of the said manoeuvre.

Graphical selection takes place in two phases:
  moving the cross-shaped cursor over the FL370 dotted line via a thumb wheel for example or any other equivalent means; then
  when the cursor arrives in the vicinity of this FL370 dotted line, this line is highlighted. The crew can then validate i.e. validate its desire to obtain the flight level FL370 as target flight level, for example by means of a button or other (e.g. a rapid double touch if it is a touch screen).

The targeted flight level then changes to cyan subsequent to this selection, and the dialogue window dedicated to flight level change appears on the right side for example of the tactile viewing display as illustrated in FIG. 10.

The system determines that aircraft OC815 can be used as reference aircraft for an ITP procedure, the aircraft lying within a circle as per the above-described symbology, but that aircraft JAL640 is blocking the procedure being contained within a triangle.

It is therefore not expedient to send a request for flight level change immediately.

However, the system estimates that the situation should clear over the coming minute as shown in the opportunity window.

Figure 11:
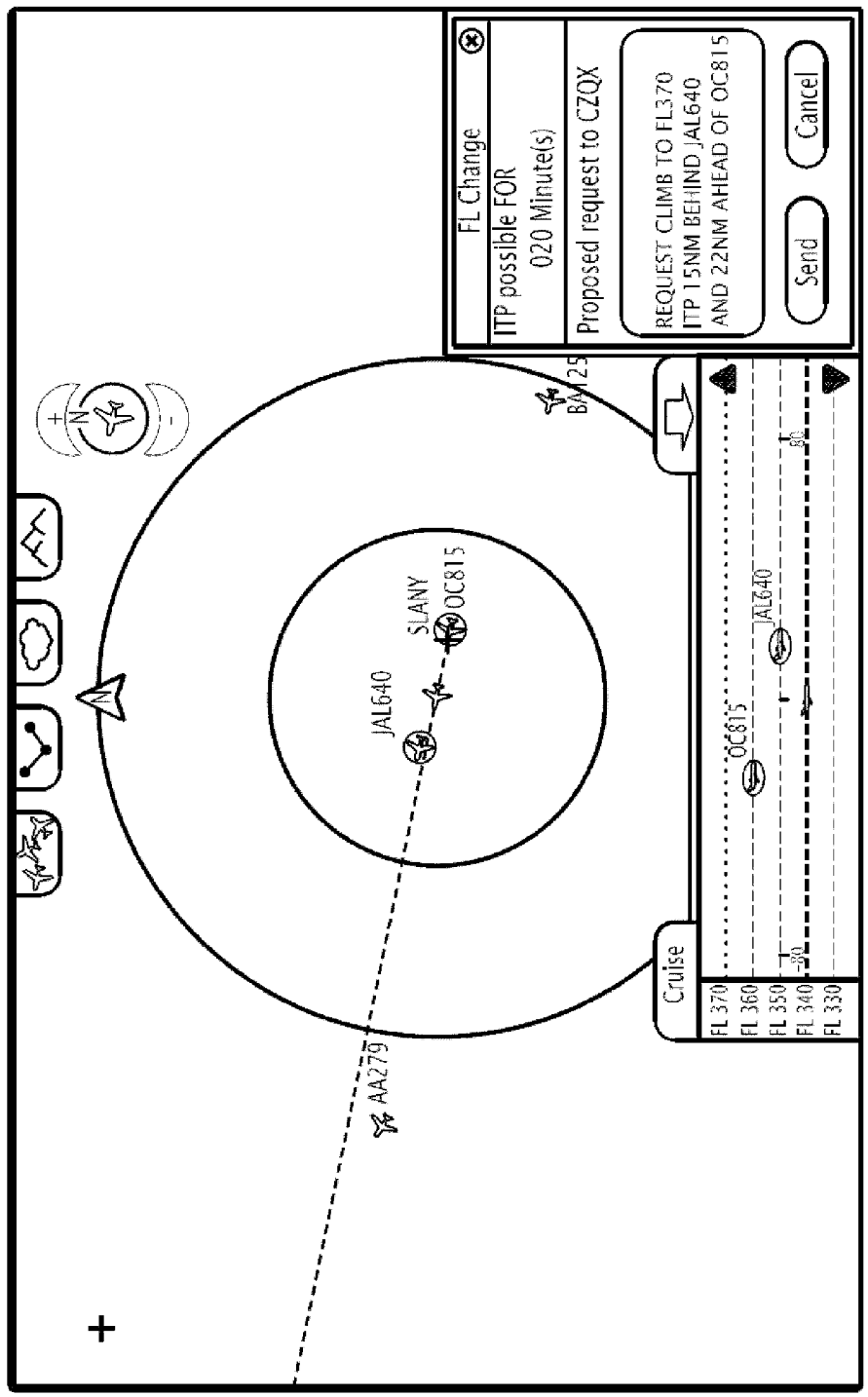

This is the situation in FIG. 11 in which it can be seen that aircraft JAL640 has now moved away and that the ITP procedure is considered to be possible over the next twenty minutes. The pre-formatted request is then presented to the crew and needs only to be sent to air traffic control by pressing on the SEND button in the corresponding dialogue window.

This is designated in FIG. 8 as step 42.

At 43, it is verified whether or not the crew has triggered the emitting of this request to the controller. If not, the crew is requested at 44 if the procedure is to be cancelled. If so, the flow chart returns to step 31.

If the pre-formatted request is sent to the air traffic controller, a change in the colour of the SEND button is triggered at 45, which turns to green to indicate that the request has been sent. This is illustrated in FIG. 12 in which it can be seen that the crew has sent the pre-formatted request via the CPDLC communication system and receives clearance from the controller via this same channel.

Figure 12:
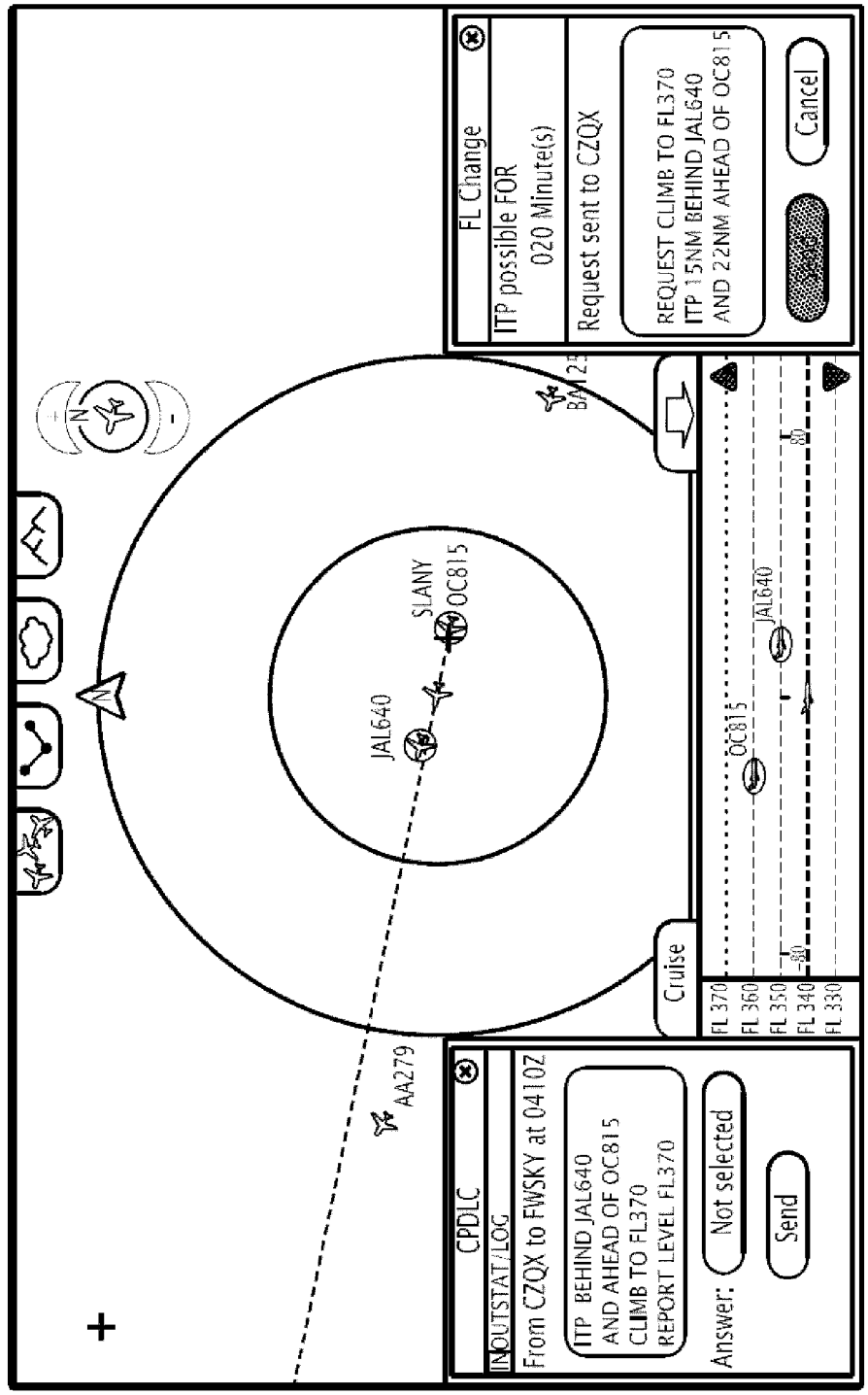

The identifiers of traffic control and of the aircraft requesting an ITP together with the time of receipt of clearance (respectively CZQX, FWSKY and 0410Z in the example illustrated in FIG. 12) are then presented to the crew in the dialogue window on the left of the display.

The receiving of clearance from the controller is designated under general reference 46 in FIG. 8, which then triggers the display of the CPDLC dialogue window at 47. The sending of the reply from the crew to the controller is monitored at 48, which in the affirmative triggers a change in the colour of the corresponding SEND button which turns green at 49, and also a change in colour of the selected flight level which turns to magenta at 50.

Figure 13:
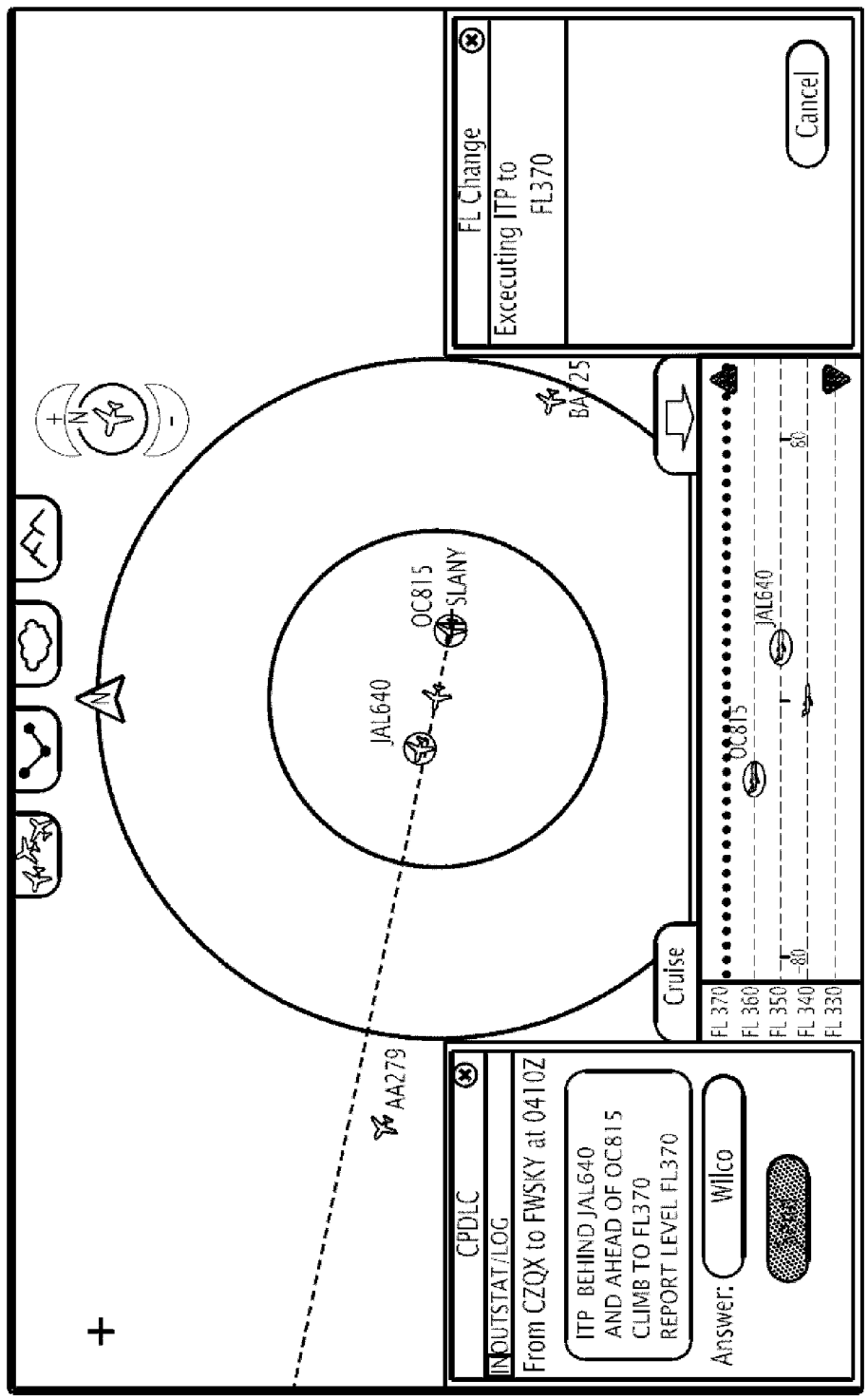

This is illustrated in FIG. 13, the crew having replied to control by <<WILCO>> for <<Will comply>> via the CPDLC system, and the manoeuvre is then automatically carried out.

The flight level FL370 then becomes the current target and changes to magenta in the vertical viewing display.

Figure 14:
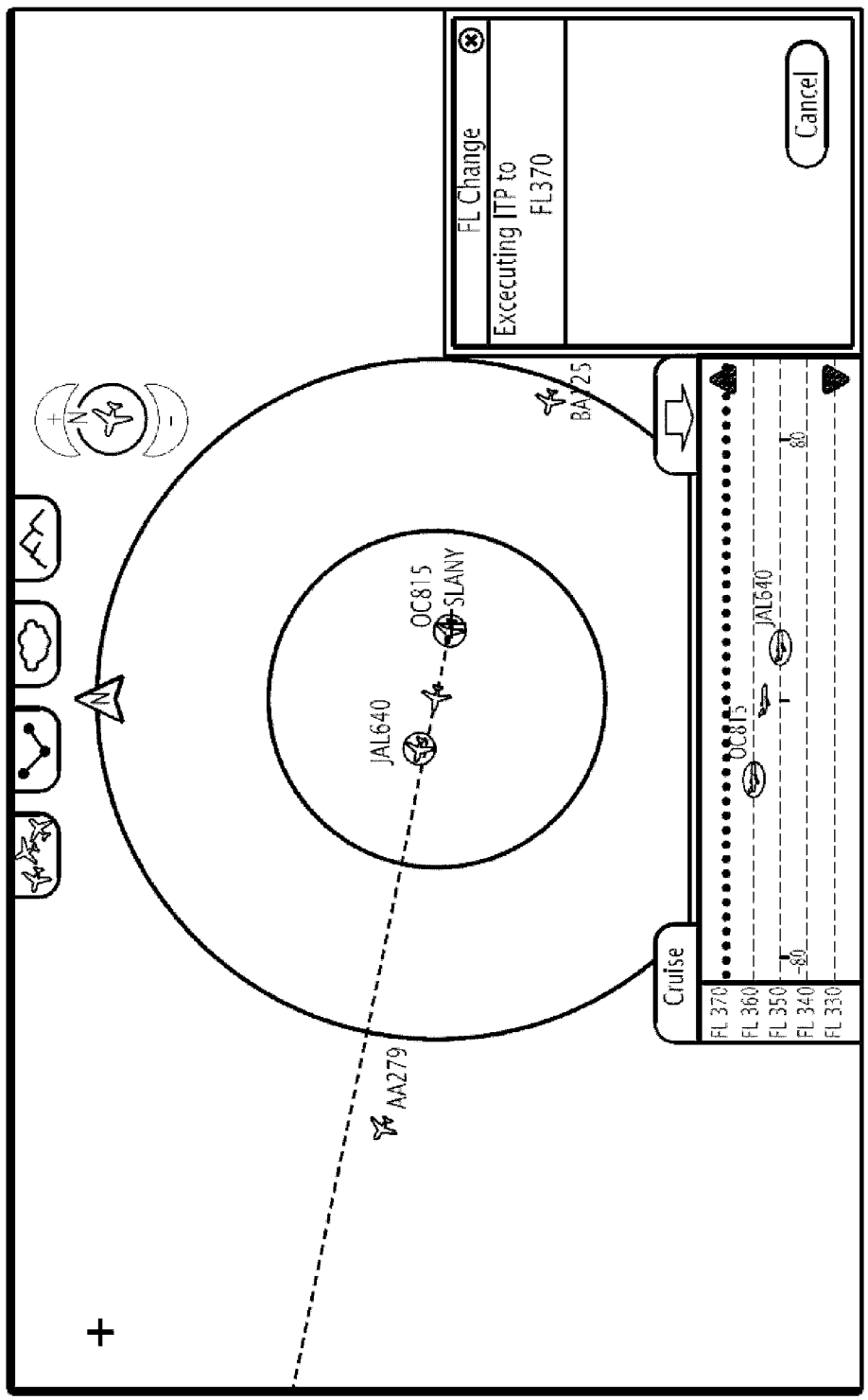

In FIG. 14, the CPDLC window disappears during the climbing phase of the aircraft, and the display of an information message is also triggered indicating execution of the ITP procedure in a FL CHANGE window.

These steps are respectively designated under references 51 and 52 in FIG. 8, for respective displaying of an information message on execution of the ITP procedure in the FL CHANGE window, and closing of the display of the CODLC dialogue window.

At 53, the performance levels of the aircraft during the manoeuvre are controlled by the computing means 8 for example, to ensure that the minimum required performance levels for conducting the manoeuvre are met.

The reaching of the target flight level is monitored at 54.

Figure 15:
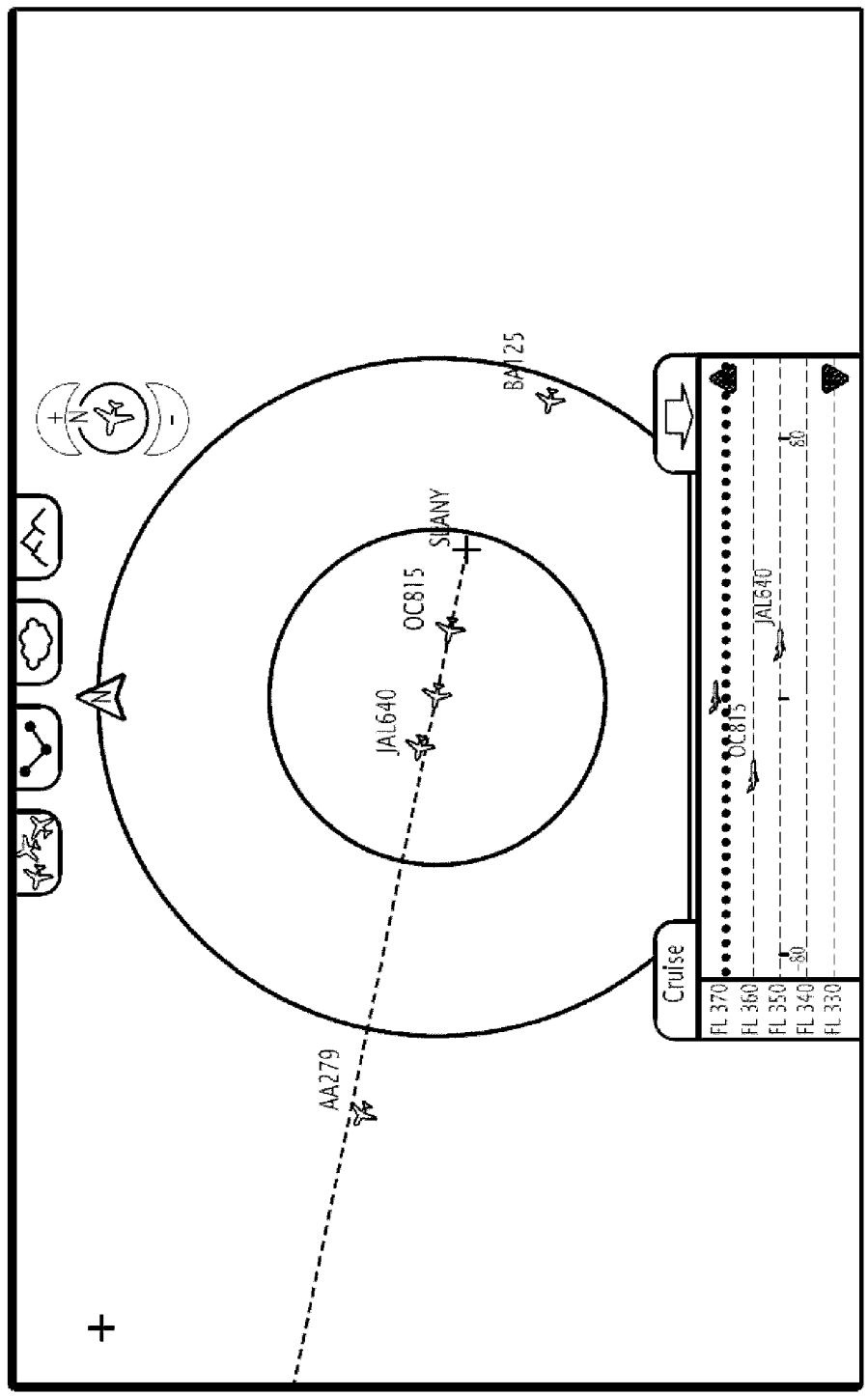

At 55, when the targeted flight level has been reached, the controller is informed (either automatically or after validation by the pilot) that the desired altitude has been reached and the display of the FL CHANGE window is then closed, and at 56 the ITP procedure is terminated as illustrated in FIG. 15, the monitoring of the performance level being ensured throughout the manoeuvre and the ITP procedure being completed once the targeted flight level has been reached.

The invention therefore provides an intuitive man/machine interface which allows simple, rapid selection of the desired flight level.

In addition, it provides assistance to the crew throughout a flight level change procedure whether this is standard or ITP procedure, thereby allowing the action of the crew to be limited to three basic, natural actions for the entire flight level change procedure, namely:
  the graphical selection of a desired flight level;
  the sending of a pre-formatted request to the air traffic controller; and
  the launch of the execution phase of flight level change on receipt of clearance from the controller.

The assistance device such as described in the foregoing has a certain number of advantages, in particular with regard to its simplicity of use resulting in a notable reduction for the crew of:
- risks of errors in data entry and interpretation of data transmitted or to be transmitted to the controller;
- risks of losing opportunities to carry out the desired manoeuvre; and also
- the workload during a procedure for flight level change.

Figure 16:
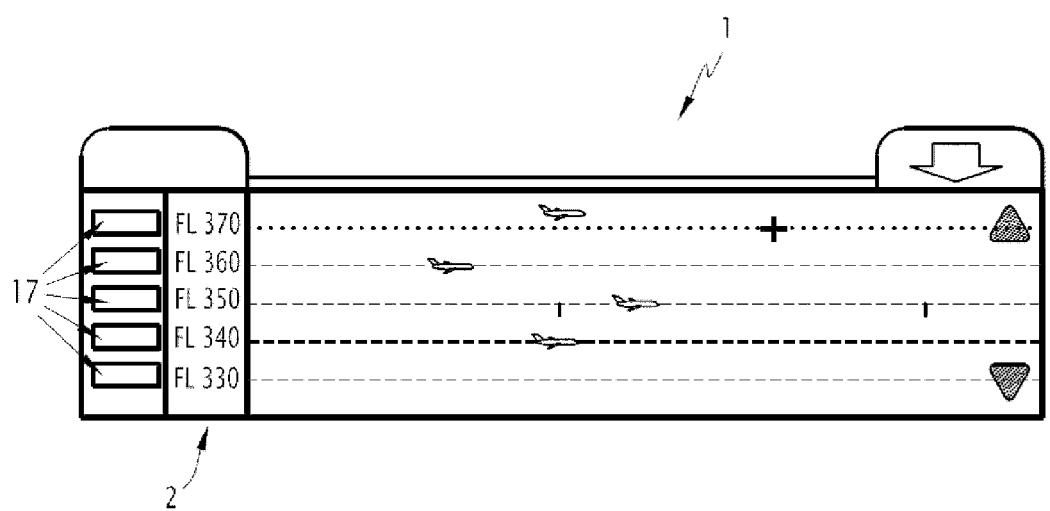
FIG. 16 illustrates another embodiment of the device according to the invention.

Another embodiment of the device according to the invention is illustrated in FIG. 16.

In this embodiment, only the viewing means 1 and the associated selection means differ from the preceding embodiment and are illustrated in this FIG. 16. In this embodiment, each flight level represented is associated with a key 17 arranged next to the corresponding flight level. The pilot then only has to press on the key corresponding to the desired flight level to obtain the selection of this level. This allows the selection to be performed in a single operation.

Evidently still further means for selecting flight levels can be envisaged.

What is claimed is:

1. A device for providing assistance to an aircraft crew for changes in flight level of an aircraft in air traffic, comprising:
   a display adapted to display an image comprising at least one zone corresponding to a target altitude for an aircraft and a position of the aircraft in a vertical plane,
   a user interface configured to receive the aircraft crew's selecting of said zone in the image, and
   at least one computer connected to the display and the user interface, and configured to determine in real-time, upon receipt of the aircraft crew's selecting through the user interface, in accordance with an opportunity estimation function, the feasibility of a flight level change procedure to the targeted altitude, as a function of air traffic for a given time horizon, the air traffic comprising distances separating the aircraft from surrounding air crafts and closing speeds of the surrounding air crafts to the aircraft,
   wherein determining the opportunity estimation function comprises the steps of:
   receiving data from at least one other aircraft;
   computing distances and closing speeds between the aircraft and said at least one other aircraft;
   estimating possibility of a flight level change in real-time, comprising verifying criteria for acceptance of the flight level change by air traffic control;
   estimating whether the aircraft meets a minimum performance level to make the flight level change;
   estimating a time when the flight level change is or will be possible; and
   verifying during the flight level change that the aircraft meets the minimum performance level and
   wherein the at least one computer is also adapted to determine, from the selected target altitude, a pre-formatted request intended to be sent to an air traffic controller, the at least one computer being adapted to instruct the display to display this request in the image when the procedure for flight level change to the selected target altitude is possible.

2. The device according to claim 1, wherein said display is also adapted to display a symbol in the image individually identifying the aircraft and any surrounding aircraft in the vertical plane.

3. The device according to claim 2, wherein said display is also adapted to display in the image a system of axes comprising a Y-axis representative of altitude and an X-axis representative of a distance separating the aircraft from any surrounding aircraft.

4. The device according to claim 2, wherein the display is adapted to display in the image a symbol identifying an aircraft considered as reference aircraft in order to perform the flight level change to the selected target altitude.

5. The device according to claim 1, wherein the flight level changes are implemented in accordance with a procedure of Airborne Traffic Situational Awareness-In Trail Procedure (ATAS-ITP).

6. The device according to claim 1, wherein said display is also capable of displaying in the image an additional user interface configured to receive the aircraft crew's input for translating in the vertical plane the zones corresponding to the target altitudes.

7. The device according to claim 1, wherein the determination by the at least one computer of the feasibility of a flight level change procedure to the targeted altitude comprises identifying of one or more aircrafts blocking an immediate flight level change to the selected target altitude and located at intermediate flight levels between the current aircraft level and the target altitude.

8. The device according to claim 1, wherein the at least one computer is also adapted to perform a set of processing operations to produce data intended for the crew on the said feasibility of performing a flight level change procedure to the selected target altitude.

9. The device according to claim 8, wherein said data produced by the at least one computer comprise:
   a remaining feasibility time for said procedure when said procedure is possible, or
   a feasibility waiting time for said procedure when said procedure is not possible immediately but possible later, and in that said display is adapted to display in the image this data intended for the crew.

10. The device according to claim 1, wherein the user interface comprises a pointer device configured to control a cursor to be moved over the image, and an input device configured to receive the aircraft crew's validating of the zone on which the cursor is pointed.

11. The device according to claim 10, wherein the pointer device comprises one selected from the group consisting of a mouse, a lever, a keypad and a touch screen, and in that the input device comprises at least one button.

12. The device according to claim 10, wherein the user interface comprises a key arranged in the vicinity of the zone in the image associated with the corresponding target altitude.

13. The device according to claim 7, wherein the display is adapted to display on the image a symbol identifying said one or more blocking aircrafts.

* * * * *